United States Patent [19]

Chuujou et al.

[11] Patent Number: 5,534,323
[45] Date of Patent: Jul. 9, 1996

[54] BIAXIALLY ORIENTED FILM OF POLYETHYLENE-2,6-NAPHTALENEDICARBOXYLATE FOR MAGNETIC RECORDING FLOPPY DISKS

[75] Inventors: Takao Chuujou; Ieyasu Kobayashi; Hisashi Hamano, all of Sagamihara; Masami Etchu, Yokohama, all of Japan

[73] Assignee: Teijin Limited, Osaka, Japan

[21] Appl. No.: 157,055

[22] PCT Filed: Apr. 2, 1993

[86] PCT No.: PCT/JP93/00422

§ 371 Date: Dec. 2, 1993

§ 102(e) Date: Dec. 2, 1993

[87] PCT Pub. No.: WO93/20553

PCT Pub. Date: Oct. 14, 1993

[30] Foreign Application Priority Data

Apr. 2, 1992 [JP] Japan ................................. 4-080856

[51] Int. Cl.⁶ ..................... B32B 27/06; B32B 27/36; G11B 5/66; G11B 5/70
[52] U.S. Cl. .................. 428/65.3; 428/143; 428/323; 428/332; 428/480; 428/694 B; 428/694 BM; 428/694 SL; 428/694 SG; 428/900; 428/910
[58] Field of Search ............... 428/323, 694 ST, 428/694 SL, 694 SG, 694 BM, 480, 910, 143, 64, 141, 402, 332, 900, 694 BR, 694 B, 65.3

[56] References Cited

U.S. PATENT DOCUMENTS

| | | | |
|---|---|---|---|
| 3,501,344 | 3/1970 | Watson et al. | 117/236 |
| 4,708,902 | 11/1987 | Utsumi et al. | 428/141 |
| 4,985,537 | 1/1991 | Utsumi et al. | 428/480 |
| 5,051,292 | 9/1991 | Katoh et al. | 428/141 |
| 5,270,096 | 12/1993 | Kato et al. | 428/143 |

FOREIGN PATENT DOCUMENTS

| | | |
|---|---|---|
| 0381213 | 8/1990 | European Pat. Off. |
| 0565733 | 10/1993 | European Pat. Off. |
| 9309166 | 5/1993 | WIPO |

Primary Examiner—Paul J. Thibodeau
Assistant Examiner—Stephen Sand
Attorney, Agent, or Firm—Sherman and Shalloway

[57] ABSTRACT

Provided are a biaxially oriented base film formed from polyethylene-2,6-naphthalenedicarboxylate as a raw material and a high-density magnetic recording floppy disk using the same. The base film and the floppy disk are characteristic in that they inhibit vibration in the film surface and have excellent viscoelasticity thereby to accomplish a contact with a magnetic head under given conditions even when rotated at high speed.

20 Claims, No Drawings

2

BIAXIALLY ORIENTED FILM OF POLYETHYLENE-2,6-NAPHTALENEDICARBOXYLATE FOR MAGNETIC RECORDING FLOPPY DISKS

The present invention relates to a biaxially oriented base film for a high-density magnetic recording floppy disk and a high-density magnetic recording floppy disk using the same. More specifically, it relates to a polyethylene-2,6-naphthalenedicarboxylate base film excellent in dimensional stability and flatness, and a high-density magnetic recording floppy disk using the same.

TECHNICAL BACKGROUND

In a magnetic recording medium for use with a floppy disk drive, there has been hitherto used, as the base film, a biaxially oriented polyethylene terephthalate film whose thermal expansion coefficient and humid expansion coefficient are relatively small, for preventing a tracking error. Even though a floppy disk has such a base film, the magnetic recording medium undergoes a dimensional change when used under high-temperature and high-humidity conditions. As a result, a magnetic head and a recorded track deviate from each other, and a tracking error occurs. At the worst case, the recording medium is curled or distorted and is hardly kept in uniform contact with the magnetic recording head. As a consequence, the coercive force and reproduction output may decrease and the recording medium may be extremely worn away. Furthermore, not only when the recording medium undergoes permanent distortion, but also when the recording medium undergoes a reversible dimensional change due to change in the environmental conditions, a track recorded on the recording medium surface and the magnetic head deviate from each other, and a tracking error occurs. For example, when the recording medium is used at a high temperature of approximately 40° to 50° C. and/or at a relative humidity as high as about 80%, a tracking error occurs. In particular, there is a defect in that a floppy disk on which recording has been effected at a low temperature (about 10° C.) or at a low humidity (about 20% RH) causes a tracking error when reproduction is carried out in atmosphere at room temperature (about 25° C.) and at a general humidity (about 60% RH). Due to this tracking error, the output envelope decreases, and the S/N ratio becomes inferior. Further, with an advance in the magnetic recording density, the thickness of the magnetic binder layer decreases, and with the increasing use of a thin magnetic metal film, the thickness of the magnetic layer decreases. As a result, the surface property, flatness and thickness unevenness of the base film increasingly exert an influence on the quality of the magnetic recording medium. When these are improper, unevenness occurs on the magnetic layer or magnetic defect occurs at a step of applying or vapor-depositing a magnetic binder, and the output decreases at a reproduction time.

Further, in a recently developed floppy disk drive used with a high-density recording floppy disk having a high recording capacity of at least 4 megabytes (MB), the magnetic layer has an increased coercive force and the number of rotation of the magnetic recording medium is increased. Therefore, the drive has a high-temperature atmosphere due to friction heat, and the magnetic recording medium vibrates greatly. Therefore, the magnetic recording medium is required to have dimensional stability and stiffness at high temperatures as compared with a conventional magnetic recording medium for a floppy disk. When a biaxially oriented polyethylene terephthalate film is used as a substrate, a track recorded on the magnetic recording medium surface and a magnetic head deviate from each other due to a dimensional change caused at a high temperature since it is poor in heat resistance, and a tracking error occurs. Further, with an increase in the number of the rotation, the floppy disk causes fluttering and fails to keep contact with a magnetic head under given conditions, and a recording error or a reproduction error occurs.

DISCLOSURE OF THE INVENTION

It is an object of the present invention to provide a biaxially oriented base film for a high-density magnetic recording floppy disk.

It is another object of the present invention to provide a biaxially oriented base film for a high-density magnetic recording floppy disk which can keep in contact with a magnetic head under given conditions even in rotation at a high speed, and therefore can prevent a recording error or a reproduction error.

It is further another object of the present invention to provide a biaxially oriented base film formed from polyethylene-2,6-naphthalenedicarboxylate, which enables the magnetic recording medium to keep in contact with a magnetic head under given conditions even in rotation at a high speed, permits the inhibition of vibration on the film surface and has excellent viscoelasticity.

It is still further another object of the present invention to provide a biaxially oriented base film for a high-capacity and high-density recording floppy disk which is free from a tracking error caused by a change in temperature and humidity and is capable of keeping a contact between a magnetic head and the magnetic recording medium under adequate conditions.

It is yet another object of the present invention to provide a high-density magnetic recording floppy disk using the biaxially oriented base film of the present invention.

Other objects and advantages of the present invention will be apparent from the following description.

According to the present invention, first, the above objects and advantages of the present invention are achieved by a biaxially oriented base film for a high-density magnetic recording floppy disk, (a) the biaxially oriented base film consisting essentially of polyethylene-2,6-naphthalenedicarboxylate, (b) the biaxially oriented base film having surface protrusions whose height (h, unit: nm) and number satisfy the following expressions (1), (2) and (3), $$1 \leq h < 50 \quad 2{,}000\text{--}20{,}000 \text{ protrusions/mm}^2 \quad (1)$$

$$50 \leq h < 100 \quad 0\text{--}2{,}000 \text{ protrusions/mm}^2 \quad (2)$$

$$100 \leq h \quad 0\text{--}300 \text{ protrusions/mm}^2 \quad (3)$$

(c) the biaxially oriented base film having a plane orientation coefficient (NS) and an average refractive index ($\bar{n}$) which satisfy the following expressions (4) and (5), $$NS \geq 1.607\bar{n} - 2.434 \quad (4)$$

$$1.665 \leq \bar{n} \leq 1.675 \quad (5)$$

(d) the biaxially oriented base film having a viscoelastic coefficient (tan δ), measured in one inplane direction at a frequency of 110 Hz at a temperature of 60° C., of 0.08 or less, (e) the biaxially oriented base film having a heat shrinkage, measured in one in-plane direction after heat treatment under no load in an atmosphere of 60° C. and 80% RH for 72 hours, of 0.05% or less and a heat shrinkage, measured after heat treatment under no load at 105° C. for 0.5 hour, of 0.3% or less.

The polyethylene-2,6-naphthalenedicarboxylate constituting the biaxially oriented base film of the present invention is formed from naphthalenedicarboxylic acid as a main acid component. Therefore, it may contain units from a small amount of other dicarboxylic acid component. Further, it is also formed from ethylene glycol as a main glycol component. Therefore, it may contain units from a small amount of other glycol component. Examples of the dicarboxylic acid component other than the naphthalenedicarboxylic acid component include aromatic dicarboxylic acids such as terephthalic acid, isophthalic acid, diphenylsulfonedicarboxylic acid and benzophenonedicarboxylic acid; aliphatic dicarboxylic acids such as succinic acid, adipic acid, sebacic acid and dodecanedicarboxylic acid; and alicyclic dicarboxylic acids such as hexahydroterephthalic acid and 1,3-adamantanedicarboxylic acid. Examples of the glycol component other than the ethylene glycol include 1,3-propanediol, 1,4-butanediol, 1,6-hexanediol, neopentyl glycol, 1,4-cyclohexanedimethanol and p-xylylene glycol. Further, additives such as a stabilizer and a colorant may be incorporated into the polymer. The above polyethylene-2,6-naphthalenedicarboxylate is generally produced by a known method according to a melt polymerization method. For the production, an additive such as a catalyst may be used as required.

The intrinsic viscosity of the polyethylene-2,6-naphthalenedicarboxylate is preferably in the range of 0.45 to 0.90.

Basically, the biaxially oriented base film of the present invention can be produced by any one of known or conventionally accumulated film-forming methods. For example, it can be produced by a method in which dry polyethylene-2,6-naphthalenedicarboxylate is melt-extruded, the extrudate was rapidly cooled on a casting drum to obtain an unstretched film, and the unstretched film is consecutively or simultaneously biaxially stretched and then thermoset.

The thickness of the biaxially oriented base film of the present invention is preferably in the range of 25 to 75 μm, more preferably in the range of 25 to 62 μm. Naturally, the above thickness shall not be limited to the above thickness range.

The height and number of protrusions formed on the surface of the biaxially oriented base film of the present invention are within specific ranges. It has been found that, due to this, a magnetic recording floppy disk using it is free from the occurrence of drop-out and excellent in electromagnetic conversion characteristics and the base film is improved in handling properties. In the present invention, the height (h, unit: nm) and number of the protrusions formed on the surface of the biaxially oriented base film satisfy the following expressions (1), (2) and (3).

| $1 \leq h < 50$ 2,000–20,000 protrusions/mm$^2$ | (1) |
|---|---|
| $50 \leq h < 100$ 0–2,000 protrusions/mm$^2$ | (2) |
| $100 \leq h$ 0–300 | (3) |

Preferably, they satisfy the following expressions (1), (2) and (3).

| $1 \leq h < 50$ 3,000–18,000 pieces/mm$^2$ | (1) |
|---|---|
| $50 \leq h < 100$ 0–200 protrusions/mm$^2$ | (2) |
| $100 \leq h$ 0–100 protrusions/mm$^2$ | (3) |

More preferably, they satisfy the following expressions (1), (2) and (3).

| $1 \leq h < 50$ 3,000–8,000 protrusions pieces/mm$^2$ | (1) |
|---|---|
| $50 \leq h < 100$ 0–100 protrusions/mm$^2$ | (2) |
| $100 \leq h$ 0–100 protrusions/mm$^2$ | (3) |

Particularly preferably, they satisfy the following expressions (1), (2) and (3).

| $1 \leq h < 50$ 4,000–8,000 protrusions/mm$^2$ | (1) |
|---|---|
| $50 \leq h < 100$ 0–50 protrusions/mm$^2$ | (2) |
| $100 \leq h$ 0–50 protrusions/mm$^2$ | (3) |

When the number of protrusions having a height (h, nm) of $1 \leq h < 50$ exceeds 20,000 protrusions/mm$^2$, the protrusions are abraded by rolls in calendering for forming a magnetic recording medium, and drop-out occurs due to abrasion in use as a floppy disk. When the number of protrusions having a height of $50 \leq h < 100$ exceeds 2,000 protrusions/mm$^2$, the electromagnetic conversion characteristic decreases in use as a magnetic recording medium. When the number of protrusions having a height of $100 \leq h$ exceeds 300 protrusions/mm$^2$, the electromagnetic characteristic decreases, drop-out occurs, and a spacing loss increases to make the output insufficient. When the number of protrusions having a height of $1 \leq h < 50$ is smaller than 2,000 protrusions/mm$^2$, the handling is very difficult, since the lubricity of the base film is inferior, and in an extreme case, a blocking phenomenon takes place and crinkling occurs. Further, a magnetic recording medium using such film is inferior in abrasion resistance, and this film is not competent to endure 10,000,000 passes on one track in a durability test. The number of protrusions having a height of h<1 is not specially limited.

For obtaining a biaxially oriented base film having surface properties satisfying the above expressions (1), (2) and (3), for example, inert solid fine particles having a single particle size distribution or a plurality of particle size distributions are preferably incorporated into the polyethylene-2,6-naphthalenedicarboxylate. Examples of the inert solid fine particles include (1) silicon dioxide (including hydrate, silica sand and quartz); (2) alumina; (3) silicates containing at least 30% by weight of an SiO$_2$ component (e.g., amorphous or crystalline clay mineral and aluminosilicate (including a calcined material and hydrate), chrysotile, zircon and fly ash); (4) oxides of Mg, Zn, Zr and Ti; (5) sulfates of Ca and Ba; (6) phosphates of Li, Na and Ca (including monohydrogen salts and dihydrogen salts); (7) benzoates of Li, Na and K; (8) terephthalates of Ca, Ba, Zn and Mn; (9) titanates of Mg. Ca, Ba, Zn, Cd, Pb, Sr, Mn, Fe, Co and Ni; (10) chromates of Ba and Pb; (11) carbon (e.g., carbon black and graphite); (12) glass (e.g., powdered glass and glass beads); (13) carbonates of Ca and Mg; (14) fluorite; and (15) ZnS. More preferred are silicon dioxide, silicic acid anhydride, hydrous silicic acid, aluminum oxide, aluminum silicate (including a calcined material and hydrate), monolithium phosphate, trilithium phosphate, sodium phosphate, calcium phosphate, barium sulfate, titanium oxide, lithium benzoate, double salts of these compounds (including hydrates), powdered glass, clay (including kaolin, bentonite and terra abla), talc, and calcium carbonate. The most preferred are silicon dioxide, titanium oxide and calcium carbonate.

The inert solid fine particles may be incorporated into the polyethylene-2,6-naphthalenedicarboxylate before or during the polymerization of the polyethylene-2,6-naphthalenedicarboxylate, or when the polyethylene-2,6-naphthalenedicarboxylate is within an extruder and pelletized after the polymerization, or when the polyethylene-2,6-naphthalenedicarboxylate is within an extruder and melt-extruded in the form of a sheet. Of these occasions, in view of dispersibility, it is preferred to incorporate them before the polymerization. The method for obtaining the film surface properties for the biaxially oriented base film of the present invention is not limited only to the above method in which the inert solid fine particles are incorporated into the polyethylene-2,6-naphthalenedicarboxylate. For example, there is a method in which a phosphorus component or other necessary additive is added at the polymerization time to form fine particles in the polymerization system whereby the fine particles are contained in the film. Further, it is also preferred to employ a method of blending a polymer obtained by the polymerization during which a phosphorus component is added and a polymer obtained by the polymerization during which inert solid fine particles are added.

In the biaxially oriented polyethylene-2,6-naphthalenedicarboxylate base film of the present invention, further, the plane orientation coefficient (NS) and average refractive index ($\bar{n}$) satisfy the following expressions (4) and (5).

$$NS \leq 1.607\bar{n}31\ 2.434 \quad (4)$$

$$1.665 \leq \bar{n} \leq 1.675 \quad (5)$$

The plane orientation coefficient (NS) is defined by the following equation (A), and the average refractive index ($\bar{n}$) is defined by the following equation (B).

$$NS = \frac{n_x + n_y}{2} - n_z \quad (A)$$

$$\bar{n} = \frac{n_x + n_y + n_z}{3} \quad (B)$$

$n_x$ represents the refractive index of a biaxially oriented base film in a machine direction, $n_y$ represents the refractive index in a direction at right angles to the machine direction, and $n_z$ represents the refractive index in a film thickness direction.

In the present invention, the preferred relationship between NS and $\bar{n}$ is represented by the following expression (4)-1.

$$NS \leq 1.607\bar{n} - 2.430 \quad (4)\text{-}1$$

The biaxially oriented base film of the present invention has a viscoelastic coefficient (tan δ), measured in one in-plane direction at a frequency of 110 Hz at a temperature of 60° C., of 0.08 or less, preferably 0.06 or less.

The biaxially oriented base film of the present invention satisfy the above expression (4) (preferably (4)-1) and the expression (5) and has the above viscoelastic coefficient, whereby it has proper stiffness when formed into a floppy disk. Therefore, it can give a magnetic recording medium which is excellent in tracking properties for a magnetic head, generates less head vibration and is stable in output. Further, it gives a magnetic recording floppy disk which has a low thermal expansion coefficient and a low humid expansion coefficient, has less difference in these values and is free from a tracking error. In other words, when the above (4) and (5) and the above viscoelastic coefficient are not satisfied simultaneously, the floppy disk causes fluttering, the contact with a magnetic head under given conditions cannot be maintained, and a recording error and a reproduction error are caused. Further, the thermal expansion coefficient and the humid expansion coefficient increase, and their differences increase. Moreover, the improper sagging causes surface unevenness and magnetic defect on a magnetic layer, and the fluctuation in output occurs in reproduction.

In particular, when $\bar{n}$ exceeds 1.675, the floppy disk using a film having such $\bar{n}$ has poor stiffness and hence causes fluttering. Therefore, the contact with a magnetic head under given conditions cannot be maintained, and a recording error and a reproduction error occur. Further, the base film is unevenness in thickness, and this unevenness causes surface unevenness and magnetic defect on a magnetic layer when the base film is used in a magnetic recording medium. When $\bar{n}$ is smaller than 1.665, the in-plane differences of the thermal expansion coefficient and the humid expansion coefficient increase, and the heat shrinkage is large. Therefore, a tracking error is liable to occur.

For obtaining the biaxially oriented base film of the present invention which satisfy the above expressions (4) and (5) and the above viscoelastic coefficient, stretching conditions and thermosetting temperature are properly selected. Specifically, any known stretching methods may be employed. The stretching temperature is generally between 80° C. and 140° C. The stretch ratio in the longitudinal direction is 2.5 to 5.0 times, preferably 2.8 to 4.3 times, more preferably 3.0 to 4.0 times, and the stretch ratio in the transverse direction is 2.5 to 5.0 times, preferably 2.8 to 4.3 times, more preferably 3.0 to 4.0 times. The so-obtained biaxially oriented film is thermoset at 180° to 260° C., preferably 180° to 250° C., for 1 to 100 seconds. By properly selecting these stretching conditions and thermosetting temperature, the intended film can be obtained. However, the method for the production of the biaxially oriented base film of the present invention is not limited to the above method. The stretching may be carried out lengthwise and widthwise at once, or consecutively lengthwise and widthwise or widthwise and length wise, by means of an ordinary roll or stenter.

The biaxially oriented base film of the present invention is required to have a heat shrinkage of 0.05% or less when measured in one in-plane direction after heat treatment under no load in an atmosphere of 60° C. and 80% RH for 72 hours. The heat shrinkage is preferably 0.03% or less, more preferably 0.02% or less. When the heat shrinkage of the film exceeds 0.05% and when a high-density magnetic recording medium using such film is allowed to stand at a high temperature at a high humidity, a magnetic head and a recorded track deviate from each other and consequently, a tracking error may occur, or the recording medium may undergo curling or distortion, with the consequence that uniform contact with a magnetic recording head can not be maintained, the coercive force and reproduction output may decrease, and the magnetic recording medium may be abraded to a great extent. The heat shrinkage of 0.05% or less after heat treatment at 65° C. at 80% RH for 72 hours can be accomplished by heat-treating the stretched film. The heat treatment temperature is approximately 150° to 240° C. During the heat treatment, it is preferred to maintain tension to be applied to the film as low as possible, or the film may be loosen so long as the film flatness can be maintained. However, an excessive increase in the heat treatment temperature results in deterioration of the mechanical properties, and many scratches occur in a step for forming a magnetic tape, abrasion dust formed adheres to the magnetic surface of the magnetic tape, and drop-out is caused. Undesirably, further, an extreme increase in the heat treatment temperature extremely increases the thermal expansion coefficient and the humid expansion coefficient. As another means for decreasing the heat shrinkage, there is a method in which the film is relaxed by passing it through a nip portion formed by two rolls having different velocities and heating it at a temperature equal to, or higher than, the glass transition temperature (Tg) of the polyethylene-2,6-naphthalenedicarboxylate. As another means, there may be a method in which the film is subjected to aging treatment. The aging treatment is carried out by treating a film roll, ideally a film (sheet) slitted nearly in the shape of a disk, under low tension at approximately 40° to 70° C. for a long period of time (10 to 200 hours). The conditions for the above heat treatment and aging treatment can be determined by the low-temperature dimensional stability of the film.

The biaxially oriented base film of the present invention is further required to have a heat shrinkage, measured in one in-plane direction after heat treatment under no load at 105° C. for 0.5 hour, of 0.3% or less. The above heat shrinkage is preferably 0.2% or less, more preferably 0.1% or less. When this heat shrinkage exceeds 0.3%, and when the magnetic recording medium is used in a floppy disk drive for a high-density and high-capacity floppy disk having a capacity of at least 4 MB in particular, the magnetic recording medium undergoes a dimensional change due to a high-temperature atmosphere within the drive, and a track recorded on the surface of the magnetic recording medium and a magnetic head deviate from each other, whereby a tracking error occurs. In the worst case, further, the recording medium undergoes curling or distortion, and the recording medium hardly maintains uniform contact with a magnetic recording head. As a result, the coercive force and the reproduction output decrease. As means for decreasing the heat shrinkage after heat treatment at 105° C. for 30 minutes, there is generally employed a method in which the heat treatment temperature conditions are properly selected within the temperature range of the heat treatment carried out after the above film stretching, while it shall not be specially limited to the above method.

In the biaxially oriented base film of the present invention, further, the thermal expansion coefficient difference in any in-plane direction is preferably $8 \times 10^{-6}/°C$. or less, and the humid expansion coefficient difference in any in-plane direction is preferably $4 \times 10^{-6}/\%$ RH or less. As means for adjusting the thermal expansion coefficient and the humid expansion coefficient, there is generally employed a method in which the stretching conditions and thermosetting conditions are properly selected. The stretching is carried out by any known method. The stretching temperature is generally 80° to 140° C. The stretch ratio in the longitudinal direction is 2.5 to 5.0 times, preferably 2.8 to 4.3 times, more preferably 3.0 to 4.0 times, and the stretch ratio in the transverse direction is 2.5 to 5.0 times, preferably 2.8 to 4.3 times, more preferably 3.0 to 4.0 times. The so-obtained biaxially oriented film is thermoset at 180° to 260° C., preferably 180° to 240° C., for 1 to 100 seconds, whereby there can be obtained the biaxially oriented base film of the present invention whose deviation in tracking caused by thermal and humid expansions is small. Further, by decreasing the in-plane anisotropy of the thermal and humid expansion coefficients, the tracking deviation can be further decreased to a smaller extent, and the magnetic recording medium can be used in broad temperature humidity ranges. This biaxially oriented base film can give a magnetic recording floppy disk of which the recording density is increased. The above base film is obtained by inhibiting bowing in the heat treatment for film stretching.

In the biaxially oriented base film of the present invention, the sagging of film is preferably 15 mm or less, more preferably 10 mm or less. When the film sagging exceeds 15 mm, surface unevenness and magnetic defect of a magnetic layer may occur in applying or vapor-depositing a magnetic binder, or the output may decrease in reproduction. As means for decreasing the sagging, for example, there is a method in which the stretched and heat-treated biaxially oriented film is cooled at a temperature around its glass transition temperature. The cooling temperature therefor can be adjusted by measuring the sagging of film.

In the biaxially oriented base film of the present invention, the thickness unevenness is preferably 4% or less, more preferably 3% or less, particularly preferably 2% or less. When the film thickness unevenness exceeds 4%, with an increase in magnetic recording density and a decrease in film thickness, surface unevenness and magnetic defect of a magnetic layer may occur in applying or vapor-depositing a magnetic binder, and the output may fluctuate in reproduction. Further, due to high surface unevenness, the spacing loss is liable to increase and the output is liable to be insufficient. As means for decreasing the thickness unevenness, there is a method in which the interdistance of die lips is adjusted or the lip temperature is adjusted, and the stretch ratio in the longitudinal and transverse directions and the stretching temperatures are adjusted. These adjustments are preferably carried out while observing patterns of thickness unevenness in the longitudinal and transverse directions.

The biaxially oriented base film of the present invention is suitably used as a high-density magnetic recording floppy disk produced by forming a magnetic layer on each of its surfaces.

The magnetic layer is formed, for example, by applying any one of known ferromagnetic powders such as $\gamma$-$Fe_2O_3$, Co-containing $Fe_2O_3$, a fine acicular iron powder and a barium ferrite powder, or by forming a layer of a ferromagnetic material such as Co. Ni, Cr, Fe or an ally of these by a method such as vacuum-deposition, sputtering, ion-plating, C.V.D. (chemical vapor deposition) or electroless plating.

EXAMPLES

The present invention will be further explained hereinafter with reference to Examples.

A variety of physical property values and characteristics in the present invention were measured and defined as follows.

(1) Number of protrusions on surface

A film surface was measured with a non-contact three-dimensional roughness tester (TOPO-3D) supplied by WYKO Corporation at a measurement magnification of 40 times at a measurement area of 242 μm×239 μm (0.058 mm$^2$). A histogram of heights of protrusions on the surface and the number of the projections were obtained on the basis of the average roughness of a film surface by protrusion analysis, and the numbers of projections having each specific heights were obtained from the histogram. The measurement was carried out five times per film, and the obtained numbers of projections were added up and converted to the number of projections per a unit area (1 mm$^2$).

(2) Refractive index

A sample film was measured for an orientation degree with a molecular orientation meter MOA-2001A supplied by Kanzaki Paper Mfg. Co., Ltd., and at the same time measured for a refractive index with an Abbe refractometer using sodium D ray (589 nm) as a light source. A graph for a correlation between the orientation degree and the refractive index was drawn, and a refractive index of a large value unmeasurable with the Abbe refractometer was determined on the basis of the graph for the correlation.

(3) Heat shrinkage

A sample film having a length of about 30 cm and a width of 1 cm, which had been accurately measured for its length in advance, was placed in a constant-temperature constant-humidity chamber at 60° C.80% RH under no load, and heat-treated for 72 hour. Then, the film was taken out of the constant-temperature constant-humidity chamber, allowed to stand until it had a room temperature, and measured for a length to determine a change in the length. The heat shrinkage was determined by the following equation, $$\text{Heat shrinkage percentage} = \frac{\Delta L}{L_0} \times 100(\%)$$

wherein $L_0$ is the length before the heat treatment and $\Delta L$ is the amount of a dimensional change after the heat treatment.

Further, the heat shrinkage after heat treatment at 105°C. for 30 minutes was determined in the same manner as in the above measurement at 60° C. except that the temperature setting of the constant-temperature chamber was changed to 105° C. and that the time for the heat treatment was changed to 30 minutes.

(4) Thermal expansion coefficient

A heat mechanical analyzer TM-3000 supplied by Sinku-Riko Co., Ltd was placed in a constant-temperature constant-humidity chamber. Samplings were made at 12 portions each of which started from one point in the film at intervals of 30 degrees in the circumferential direction. These film samples had a size of 15 mm long and 5 mm wide. The film samples were preliminarily heat treated under predetermined conditions (e.g., 80° C., 120 minutes), and then they were set at the tester and measured for changes in size at the temperature of 20° C. at a humidity of 60% RH (relative humidity) and at the temperature of 40° C. at a humidity of 60% to determine thermal expansion coefficients. A difference between a maximum value and a minimum value in the samples at 12 portions was calculated.

(5) Humid expansion coefficient

A heat mechanical analyzer TM-3000 supplied by Sinku-Riko Co., Ltd was used in the same manner as in the determination of the thermal expansion coefficient. Samplings were made at 12 portions each of which started from one point in the film at intervals of 30 degrees in the circumferential direction, and 12 samples having the same size as those used in the determination of the thermal expansion coefficient was taken. The film samples were preliminarily heat treated at a temperature of 40° C. at a humidity of 90% RH (relative humidity), and then they were set at the tester and measured for changes in size at the humidity of 30% RH at 20° C. and at the humidity of 70% at 20° C. to determine humid expansion coefficients. A difference between a maximum value and a minimum value in the samples at 12 portions was calculated.

(6) Tracking deviation test (temperature change)

The following method was employed for the tracking deviation test. A magnetic layer was formed on a film and the film was subjected to a calender rolling and cut to a disk shape having an outer diameter of 20 cm and an internal diameter of 3.8 cm to obtain a floppy disk. Recording and reproduction were effected on the floppy disk by means of a recording and reproduction apparatus. A sheet recorder was rotated at 600 rpm, and a magnetic head was positioned at 8 cm from the center of the disk. A track had a width of 300 µm, and the head was formed of ferrite. A signal at 1 MHz was recorded on the floppy disk in an atmosphere at a temperature of 15° C. at a humidity of 60% RH (relative humidity), and the floppy disk was measured for a maximum output and an output envelope. Then, the ambient temperature was changed to 40° C. at a humidity of 60% RH, and the floppy disk was measured for a maximum output and an output envelope at this temperature. The output envelope at a temperature of 15° C. at a humidity of 60% RH and the output envelope at a temperature of 40° C. at a humidity of 60% RH were compared to determine a tracking state. A floppy disk having a smaller difference in output difference has superior tracking properties. When this difference is more than 3 dB, the tracking is poor and a floppy disk is evaluated as X. When the difference is 3 dB or less, a floppy disk is evaluated as ○.

(7) Tracking deviation test (humidity change)

In the same manner as in the above tracking deviation test, recording was effected in an atmosphere at a temperature of 25° C. at a humidity of 20% RH (relative humidity), and further, the atmosphere was maintained at 25° C. at a humidity of 70% RH. The output envelope at a temperature of 25° C. at a humidity of 20 RH % and the output envelope at a temperature of 25° C. at a humidity of 60% RH were compared. The tracking was evaluated in the same manner as above.

(8) Thickness unevenness

A sample having a width of 50 mm and a length of 3 m was taken by cutting a film in the transverse direction, and a sample having a width of 50 mm and a length of 3 m was taken by cutting the film in the longitudinal direction, and thickness patterns of the sample films were recorded on a recorder with a film thickness continuously measuring apparatus (electronic micrometer) supplied by Anritsusha. A height difference was determined on the basis of the peak (maximum value) and the bottom (minimum value) of the thickness patterns having a length of 3 m, and the thickness unevenness (%) was calculated by the following equation.

$$\text{Thickness unevenness} = \frac{\text{height difference}}{\text{film thickness (average)}} \times 100$$

(9) Sagging

A rolled film having a width of 1 m was allowed to run between two parallel free rolls positioned at a distance of 1,000 mm at a speed of 3 m/minute under tension of 2 kg, and a sagging length (mm) of a film edge was read with a ruler at the central position between the two rolls.

(10) Average signal amplitude

Measured according to JIS C 6291. The initial average signal amplitude and the average signal amplitude after 10,000,000 passes on one track in the durability test were measured, and a difference between these average signal amplitudes was evaluated as good or no good on the basis of a predetermined value.

(11) tan δ

A film was measured for tan δ with a dynamic viscoelasticity measuring apparatus, RHEOVIBRON DDV-1I-C, supplied by Toyo Baldwin Co., Ltd. under the following conditions.

(Measurement conditions)

Frequency: 110 Hz

Temperature-elevating rate: 1° C./min.

Sample width: 5 mm

Interchuck distance: 40 mm

Example 1

Pellets of polyethylene-2,6-naphthalenedicarboxylate (homopolymer) having an intrinsic viscosity of 0.62 dl/g (value measured at 25° C. using o-chlorophenol as a solvent) and containing 0.3% by weight of calcium carbonate fine powders having an average particle diameter of 0.5 µm were dried at 170° C. for 4 hours. The polyethylene-2,6-naphthalenedicarboxylate was melt-extruded at 300° C. and rapidly cooled on a casting drum maintained at 60° C. to obtain an unstretched film having a thickness of about 1,000 µm. The unstretched film was consecutively stretched 3.6 times in the longitudinal direction at 130° C. and 3.8 times in the transverse direction at 135° C., and then heat-treated at 230° C. for 30 seconds. Then the heat-treated film was cooled at 100° C. for 15 seconds and taken up to give a biaxially oriented polyethylene-2,6-naphthalenedicarboxylate film having a thickness of 75 µm.

Thereafter, a magnetic coating composition containing the following components was applied to both surfaces of the above biaxially oriented film to form coatings having a thickness of 1 µm.

(Magnetic coating solution)

$\gamma$-$Fe_2O_3$ 200 parts by weight

Vinyl chloride-vinyl acetate copolymer resin (VAGH, supplied by UCC) 30 parts by weight Polyurethane 20 parts by weight (PP-88, supplied by Nihon Polyurethane Kogyo Co., Ltd)

Isocyanate compound 40 parts by weight (Coronate HL, supplied by Nihon Polyurethane kogyo Co., Ltd)

Carbon (average size 0.5 µ$\phi$) 20 parts by weight

Dimethyl cyclohexane 2 parts by weight

Toluene 70 parts by weight

Methyl ethyl ketone 70 parts by weight

Cyclohexanone 70 parts by weight

After the application of the above coating composition on the polyethylene-2,6-naphthalenedicarboxylate film, the film was subjected to treatment with a calender roll. Then, the film was cut in the form of a disk having an outer diameter of 20 cm and an inner diameter of 3.8 cm to give a floppy disk.

Table 1 shows the properties of the above-obtained film and the above-obtained floppy disk. As is clear in this Table, the distribution of heights of surface protrusions was in a proper range and accordingly, the base film was excellent in handling properties, and no drop-out occurred. Further, the properties for tracking by a magnetic head were excellent, and a tracking error was overcome. In a high-temperature and high-humidity atmosphere, the magnetic disk permitted recording and reproduction, and there were no recording and reproduction errors caused by a dimensional change in use. Further, since the base film was excellent concerning the sagging and thickness unevenness, the magnetic layer had no unevenness. Therefore, there was obtained a magnetic recording medium having stable output.

Example 2

An unstretched film was obtained in the same manner as in Example 1 except that the inert solid fine particles used in Example 1 were replaced with 0.1% by weight of silica fine particles having an average particle diameter of 0.2 µm and 0.3% by weight of calcium carbonate fine particles having a particle diameter of 0.5 µm. The unstretched film was stretched 4.2 times in the longitudinal direction through a nip of two rolls having different rotation rates at a temperature of 125° C., further stretched 4.2 times in the transverse direction with a tenter, and then heat treated at 215° C. for 30 seconds. Thereafter, the film was cooled in the same manner as in Example 1 to give a biaxially oriented film having a thickness of 75 µm. In the same manner as in Example 1, the magnetic coating composition was applied, and a floppy disk was obtained. Table 1 shows the results. Like Example 1, excellent results were obtained.

Example 3

An unstretched film was obtained in the same manner as in Example 1 except that the inert solid fine particles used in Example 1 were replaced with 0.15% by weight of kaolin fine particles having an average particle diameter of 0.6 µm, and in the same manner as in Example 2, the unstretched film was stretched in the longitudinal and transverse directions, subjected to the thermosetting treatment and cooled. Further, the film was heat-treated while being floated in an oven at 100° C., thereby to carry out a 0.3% relaxation treatment. There was accordingly obtained a biaxially oriented film having a thickness of 75 µm, and in the same manner as in Example 1, the magnetic coating composition was applied and a floppy disk was obtained. Table 1 shows the results. In particular, the floppy disk had low heat shrinkage at 60°C. at 80% RH, and was excellent in dimensional stability. Like Example 1, the other results were also excellent.

Example 4

An unstretched film was obtained in the same manner as in Example 1 except that the inert solid fine particles used in Example 1 were replaced with 0.25% by weight of spherical silica fine particles having an average particle diameter of 0.25 µm, and in the same manner as in Example 1, a biaxially oriented film having a thickness of 75 µm and a floppy disk were obtained. Table 1 shows the results. There was obtained a magnetic recording medium which had smooth surfaces and had excellent properties as a floppy disk like that obtained in Example 1.

Comparative Example 1

Polyethylene terephthalate (PET) having an intrinsic viscosity of 0.65 dl/g (value measured at 25° C. using o-chlorophenol as a solvent) and containing 0.2% by weight of silica fine particles having an average particle diameter of 0.3 µm were dried at 160° C., and then the dried PET was melt-extruded at 280° C. and rapidly cooled on a casting drum maintained at 40° C. to obtain an unstretched film having a thickness of about 1,000 µm.

The above unstretched film was stretched 3.5 times in the longitudinal direction through a nip of two rolls having different rotation rates at a temperature of 90° C., further stretched 3.6 times in the transverse direction with a tenter, and then heat treated at 230° C. for 30 seconds. Then, the film was cooled at 90° C. for 15 seconds and taken up to give a biaxially oriented polyethylene terephthalate film having a thickness of 75 µm. Thereafter, in the same manner as in Example 1, the magnetic coating composition was applied to the biaxially oriented film and a floppy disk was obtained.

Table 1 shows the results. Since the film was formed from PET as a raw material, the floppy disk underwent a great dimensional change due to heat shrinkage. In particular, when the floppy disk was used in a high-temperature high-humidity atmosphere, a track recorded on the magnetic recording medium surface and a magnetic head deviated from each other, and a tracking error occurred. Further, since the floppy disk underwent curling, the reproduction output was low, and the floppy disk was not desirable as such.

Comparative Example 2

An unstretched film was obtained in the same manner as in Example 1 except that the inert solid fine particles used in Example 1 were replaced with 0.4% by weight of kaolin fine particles having an average particle diameter of 0.7 μm. The unstretched film was stretched 5.5 times in the longitudinal direction, further stretched 3.6 times in the transverse direction, and then treated at 240° C. Thereafter, the film was cooled in the same manner as in Example 1 and the resultant film was taken up. In the same manner as in Example 1, the magnetic coating composition was applied to the above-obtained polyethylene-2,6-naphthalenedicarboxylate film having a thickness of 75 μm., and a floppy disk was obtained.

Table 1 shows the results. Since protrusions having a height of 100 nm or more were dispersedly present on the base film surface, the electromagnetic conversion characteristics decreased, drop-out often occurred, and the average signal amplitude was failed to be good. Further, the floppy disk had high thermal and humid expansion coefficients and poor dimensional stability at a high temperature and high humidity, and a tracking error occurred. Furthermore, since the base film was inferior concerning the sagging and thickness unevenness, magnetic defect occurred and the output fluctuation was observed. Moreover, the variability of tan was large, and the floppy disk caused fluttering to some extent. Therefore, the floppy disk was not desirable as such.

Comparative Example 3

An unstretched film was obtained in the same manner as in Example 1 except that the inert solid fine particles used in Example 1 were replaced with 0.04% by weight of kaolin fine particles having an average particle diameter of 0.1 μm. The unstretched film was stretched 3.5 times in the longitudinal direction, further stretched 3.6 times in the transverse direction with a tenter, and then heat treated at 250° C. for 30 seconds. Thereafter, the film was cooled at 110° C. for 15 seconds to give a biaxially oriented film having a thickness of 75 μm. In the same manner as in Example 1, the magnetic coating composition was applied, and a floppy disk was obtained.

Table 1 shows the results. The above base film showed poor handling properties due to extremely smooth surfaces. When subjected to the average signal amplitude test, the magnetic disk maintained a level of good at an initial time. However, the surface durability was poor, the surface became roughened, and the magnetic disk became defective (the electromagnetic conversion characteristics sharply decreased) before 10,000,000 passes were reached. Further, the film had a low plane orientation coefficient and showed a large difference in thermal and humid expansion coefficients, and it was defective concerning the sagging and thickness unevenness. Therefore, a tracking error occurred at a high temperature and high humidity, and the output decreased and fluctuated in reproduction. The floppy disk was undesirable as such.

Comparative Example 4

An unstretched film was obtained in the same manner as in Example 1 except that the inert solid fine particles used in Example 1 were replaced with 0.5% by weight of silica fine particles having an average particle diameter of 0.2 μm. The unstretched film was stretched 3.0 times in the longitudinal direction and 3.0 times in the transverse direction, and then heat treated at 255° C. for 30 seconds to give a biaxially oriented film having a thickness of 62 μm. In the same manner as in Example 1, the magnetic coating composition was applied, and a floppy disk was obtained.

Table 1 shows the results. Since the number of the low protrusions on the base film was large, the drop-out often occurred due to abrasion. Further, since the tan δ was extremely high, the fluttering was caused, the contact with a magnetic head under given conditions was not kept, and a recording error and a reproduction error occurred. Moreover, since the in-plane orientation coefficient was low, a decrease in the output and a tracking error at a high temperature and high humidity occurred similarly to Comparative Example 3. The floppy disk was undesirable as such.

TABLE 1

|  | Unit | Ex. 1 | Ex. 2 | Ex. 3 | Ex. 4 |
| --- | --- | --- | --- | --- | --- |
| Base Properties |  |  |  |  |  |
| $1 \leq h < 50$ | protrusions/mm$^2$ | 8,812 | 4,468 | 5,186 | 8.352 |
| $50 \leq h < 100$ | protrusions/mm$^2$ | 1,482 | 68 | 1.699 | 0 |
| $100 \leq h$ | protrusions/mm$^2$ | 51 | 14 | 269 | 0 |
| Average refractive index: n | — | 1.672 | 1.671 | 1.670 | 1.672 |
| Plane orientation coefficient: NS | — | 0.265 | 0.270 | 0.268 | 0.265 |
| $1.607n-2.434$ | — | 0.253 | 0.251 | 0.250 | 0.253 |
| tanδ | — | 0.050–0.052 | 0.045–0.046 | 0.045–0.046 | 0.050–0.052 |
| Heat shrinkage 60° C. 80%RH × 1 hour | % | 0.01–0.03 | –0.01–0.05 | –0.01–0.01 | –0.01–0.03 |
| Heat shrinkage 105° C. × 30 min | % | 0–0.1 | 0.1–0.3 | 0–0.1 | 0–0.1 |
| Thermal expansion coefficient difference Δαt | × 10$^{-6}$/°C. | 6 | 5 | 6 | 6 |
| Humid expansion | × 10$^{-6}$/% RH | 3 | 2 | 3 | 3 |

TABLE 1-continued

|  | Unit | | | | |
|---|---|---|---|---|---|
| coefficient difference Δαh | | | | | |
| Sagging | mm | 8 | 12 | 10 | 8 |
| Thickness unevenness | | | | | |
| MD | % | 3.3 | 2.3 | 2.3 | 3.3 |
| TD | " | 3.2 | 1.9 | 2.1 | 3.2 |
| Disk properties | | | | | |
| 40° C. Reproduction envelope | — | ○ | ○ | ○ | ○ |
| 70% RH reproduction envelope | — | ○ | ○ | ○ | ○ |
| Average signal amplitude | | | | | |
| Initial value | — | good | good | good | good |
| After 10,000,000 passes | — | good | good | good | good |

|  | Unit | Comp. Ex. 1 | Comp. Ex. 2 | Comp. Ex. 3 | Comp. Ex. 4 |
|---|---|---|---|---|---|
| Base Properties | | | | | |
| $1 \leq h < 50$ | protrusions/mm² | 9,158 | 8,613 | 1,615 | 30,552 |
| $50 \leq h < 100$ | protrusions/mm² | 8 | 3,189 | 0 | 203 |
| $100 \leq h$ | protrusions/mm² | 0 | 514 | 0 | 0 |
| Average refractive index: $\bar{n}$ | — | 1.604 | 1.661 | 1.669 | 1.646 |
| Plane orientation coefficient: NS | — | 0.164 | 0.244 | 0.241 | 0.162 |
| $1.607\bar{n} - 2.434$ | — | 0.144 | 0.235 | 0.248 | 0.211 |
| tanδ | — | 0.062~0.065 | 0.040~0.065 | 0.070~0.075 | 0.105~0.120 |
| Heat shrinkage 60° C. 80% RH × 1 hour | % | 0.01~0.32 | −0.01~0.10 | −0.01~0.01 | 0.01~0.09 |
| Heat shrinkage 105° C. × 30 min | % | 0.8~1.2 | 0.2~0.7 | 0~0.1 | 0.2~0.5 |
| Humid expansion coefficient difference Δαh | × 10⁻⁶/°C. | 7 | 19 | 14 | 21 |
| Thermal expansion coefficient difference Δαh | × 10⁻⁶/% RH | 3 | 10 | 7 | 15 |
| Sagging | mm | 8 | 20 | 25 | 24 |
| Thickness unevenness | | | | | |
| MD | % | 3.0 | 1.2 | 7.2 | 8.2 |
| TD | " | 3.2 | 5.7 | 5.3 | 7. |
| Disk properties | | | | | |
| 40° C. reproduction envelope | — | X | X | X | X |
| 70% RH reproduction envelope | — | X | X | X | X |
| Average signal amplitude | | | | | |
| Initial value | — | No good | No good | No good | No good |
| After 10,000,000 passes | — | No good | No good | No good | No good |

What is claimed is:

1. A biaxially oriented base film for a high-density magnetic recording floppy disk, (a) the biaxially oriented base film consisting essentially of polyethylene-2,6-naphthalenedicarboxylate, (b) the biaxially oriented base film having surface protrusions formed by inert particles dispersed in the film whose height, (h) in nanometers and number of surface protrusions satisfy the following expressions (1), (2) and (3), $1 \leq h < 50$ and 2,000–20,000 protrusions/mm² (1)

$50 \leq h < 100$ and 0–2,000 protrusions/mm² (2)

$100 \leq h$ and 0–300 protrusions/mm² (3)

(c) the biaxially oriented base film having a plane orientation coefficient (NS) and an average refractive index ($\bar{n}$) which satisfy the following expressions (4) and (5), $NS \leq 1.607\bar{n} - 2.434$ (4)

$1.665 \leq \bar{n} \leq 1.675$        (5)

(d) the biaxially oriented base film having a viscoelastic coefficient (tan δ), measured in one in-plane direction at a frequency of 110 Hz at a temperature of 60° C., of 0.08 or less, (e) the biaxially oriented base film having a heat shrinkage, measured in one in-plane direction after heat treatment under no load in an atmosphere at 60° C. at 80% RH for 72 hours, of 0.05% or less and a heat shrinkage, measured after heat treatment under no load at 105° C. for 0.5 hour, of 0.3% or less.

2. The biaxially oriented base film of claim 1, wherein the height, (h) in nanometers and number of the surface protrusions satisfy the following expressions (1), (2) and (3), $1 \leq h < 50$ and 3,000–18,000 protrusions/mm$^2$        (1)

$50 \leq h < 100$ and 0–200 protrusions/mm$^2$        (2)

$100 \leq h$ and 0–100 protrusions/mm$^2$        (3)

3. The biaxially oriented base film of claim 1, wherein the plane orientation coefficient (NS) and the average refractive index ($\bar{n}$) satisfy the following expression (4), $NS \leq 1.607\bar{n} - 2.430$        (4)

and the above expression (5).

4. The biaxially oriented base film of claim 1, wherein the viscoelastic coefficient (tan δ), measured in one in-plane direction, was 0.06 or less.

5. The biaxially oriented base film of claim 1, wherein the heat shrinkage, measured in one in-plane direction after heat treatment under no load in an atmosphere at 60° C. at 80% RH for 72 hours, is 0.02% or less.

6. The biaxially oriented base film of claim 1, wherein the heat shrinkage, measured in one in-plane direction after heat treatment under no load at 105° C. for 0.5 hour, is 0.2% or less.

7. The biaxially oriented base film of claim 1, wherein the biaxially oriented base film has a thermal expansion coefficient whose maximum and minimum value difference in a surface of the film is $8 \times 10^{-6}$/°C. or less.

8. The biaxially oriented base film of claim 1, wherein the biaxially oriented base film has a humid expansion coefficient whose maximum and minimum value difference in a surface of the film is $4 \times 10^{-6}$/% RH or less.

9. The biaxially oriented base film of claim 1, wherein the biaxially oriented base film shows a sagging of 15 mm or less.

10. The biaxially oriented base film of claim 1, wherein the biaxially oriented base film has a thickness unevenness of 4% or less.

11. A high-density magnetic recording floppy disk which comprises the biaxially oriented base film of claim 1 having two surfaces and a magnetic layer comprising magnetic particles in a binder formed on both surfaces of the biaxially oriented base film.

12. The biaxially oriented base film of claim 1, wherein the inert particles have an average particle diameter of 0.25 to 0.6 μm.

13. A biaxially oriented base film for a high-density magnetic recording floppy disk, (a) the biaxially oriented base film consisting essentially of polyethylene-2,6-naphthalenedicarboxylate, (b) the biaxially oriented base film having surface protrusions formed by inert particles having an average particle diameter of 0.25 to 0.6 μm and in an amount of 0.15 to 0.40 wt. % dispersed in the film whose height, (h) in nanometers, and number of surface protrusions satisfy the following expressions (1), (2) and (3), $1 \leq h < 50$ and 3,000–18,000 protrusions/mm$^2$        (1)

$50 \leq h < 100$ and 0–200 protrusions/mm$^2$        (2)

$100 \leq h$ and 0–100 protrusions/mm$^2$        (3)

(c) the biaxially oriented base film having a plane orientation coefficient (NS) and an average refractive index ($\bar{n}$) which satisfy the following expressions (4) and (5), $NS \geq 1.607\bar{n} - 2.430$        (4)

$1.665 \leq \bar{n} \leq 1.675$        (5)

(d) the biaxially oriented base film having a viscoelastic coefficient (tan δ), measured in one in-plane direction at a frequency of 110 Hz at a temperature of 60° C., of 0.08 to 0, (e) the biaxially oriented base film having a heat shrinkage, measured in one in-plane direction after heat treatment under no load in an atmosphere at 60° C. at 80% RH for 72 hours, of 0.05% to 0% and a heat shrinkage, measured after heat treatment under no load at 105° C. for 0.5 hour, of 0.3% to 0%.

14. The biaxially oriented base film of claim 13, wherein the viscoelastic coefficient (tan δ), measured in one in-plane direction, was 0.06 or less.

15. The biaxially oriented base film of claim 13, wherein the heat shrinkage, measured in one in-plane direction after heat treatment under no load in an atmosphere at 60° C. at 80% RH for 72 hours, is 0.02% or less.

16. The biaxially oriented base film of claim 13, wherein the heat shrinkage, measured in one in-plane direction after heat treatment under no load at 105° C. for 0.5 hour, is 0.2% or less.

17. The biaxially oriented base film of claim 13, wherein the biaxially oriented base film has a thermal expansion coefficient whose maximum and minimum value difference is $8 \times 10^{-6}$/°C. or less.

18. The biaxially oriented base film of claim 13, wherein the biaxially oriented base film has a humid expansion coefficient whose maximum and minimum value difference is $4 \times 10^{-6}$/% RH or less.

19. The biaxially oriented base film of claim 13, wherein the biaxially oriented base film has a thickness unevenness of 4% or less.

20. A high-density magnetic recording floppy disk which comprises the biaxially oriented base film of claim 13 having two surfaces and a magnetic layer comprising magnetic particles in a binder formed on both surfaces of the biaxially oriented base film.

\* \* \* \* \*